United States Patent [19]

Touborg

[11] 4,025,295

[45] May 24, 1977

[54] METHOD OF BURNING PULVEROUS RAW MATERIAL AND ROTARY KILN PLANT THEREFOR

[75] Inventor: Jorn Touborg, Copenhagen Valby, Denmark

[73] Assignee: F. L. Smidth & Co., Cresskill, N.J.

[22] Filed: June 18, 1975

[21] Appl. No.: 587,864

[30] Foreign Application Priority Data

June 18, 1974 United Kingdom ............. 27052/74

[52] U.S. Cl. .................................. 432/14; 34/57 A; 432/15; 432/106
[51] Int. Cl.² ..................... F27B 15/00; F26B 17/00
[58] Field of Search ...................... 432/14, 15, 106; 34/57 A, 57 R

[56] References Cited

UNITED STATES PATENTS

| | | | |
|---|---|---|---|
| 3,864,075 | 2/1975 | Christiansen | 432/106 |
| 3,881,861 | 5/1975 | Ritzmann | 432/106 |
| 3,891,382 | 6/1975 | Lawall et al. | 432/106 |
| 3,910,754 | 10/1975 | Weber et al. | 432/14 |

*Primary Examiner*—John J. Camby
*Attorney, Agent, or Firm*—Pennie & Edmonds

[57] ABSTRACT

An improved method is disclosed for heat treating a preheated, pulverous raw material such as cement raw meal wherein a stream of oxygen containing gas is directed through a calcination chamber and the preheated raw meal and a calcining fuel are fed separately therein in a manner which provides mixing of the raw meal and the fuel and thereafter creates eddys of the mixture when it contacts the oxygen containing gas. The combined stream is directed out of the chamber and particles of raw meal are separated therefrom. A calcination plant is disclosed for practicing the method of the invention and a rotary kiln plant is disclosed for burning cement raw meal in a manner which includes at least partial calcination according to the inventive method.

34 Claims, 7 Drawing Figures

RAW MATERIAL

OXYGEN

FUEL

METHOD OF BURNING PULVEROUS RAW MATERIAL AND ROTARY KILN PLANT THEREFOR

BACKGROUND OF THE INVENTION

1. Field of the Invention

This invention relates to a method of heat treating a preheated pulverous raw material consisting entirely of or containing at least a portion of lime prior to burning it in a rotary kiln. The invention relates to an improved method of at least partially calcining such pulverous, raw material and improved calcination plants for treating such raw material according to the improved method wherein heat is supplied before the material is subjected to any finishing calcination and/or any other heat treatment such as sintering in a rotary kiln. The invention also relates to a rotary kiln plant for burning such raw materials.

2. Description of the Prior Art

Calcination in the present context is to be understood as an expulsion of carbon dioxide from calcium carbonate according to the equation:

$$CaCo_3 \rightarrow CaO + CO_2$$

which is an endothermic process (i.e. a process which absorbs heat). When the raw material is cement raw meal, the aforesaid finishing heat treatment following the calcination is a sintering by which cement clinker is produced. Such sintering is an exothermic process in which heat is given off.

The heat necessary for carryig through the conversion of the cement raw meal to cement clinker is usually provided by burning fuel which together with combustion air is introduced into a combustion chamber and forms smoke gas. As a result, the energy contained in the fuel is released for heating the smoke gas to a high temperature. The hot smoke gas is then brought into contact with the raw meal to be heat treated. The heat is mainly used for preheating and calcining the raw meal, its sintering being as mentioned an exothermic process in practice, however, heat must be supplied in order to start the sintering.

Owing, among other things, to the presence of alkalis in the raw meal and the consequent drawbacks it is sometimes preferred to carry through the preheating and calcining of the raw meal by hot gas from one source of heat and the initiation of its sintering by hot gas from another source of heat.

In the case of calcination of cement raw meal it is desirable to carry through this process at a low temperature. However it is difficult to do that by means of smoke gases having a high temperature since there is then a great risk of excessive heating of the raw meal occurring locally and temporarily. Even excessive heating of a part of the raw meal for a short time may involve expulsion of alkali vapors or the production of melts which may give rise to cakings. Excessive heating of the raw meal at the calcination stage may also prevent chemical reactions intended to take place at a later stage of the whole process for the manufacture of cement clinker. For example, a clinker mineral formation at the stage of the total process at which the calcination is to take place will involve a disadvantageous development of the whole process.

In a related development, my commonly assigned U.S. patent application Ser. No. 423,436, filed Dec. 10, 1973, now U.S. Pat. No. 3,955,995 is directed to calcination of pulverous material by mixing preheated raw material intimately with a fuel capable of producing a combustible gas upon contacting the raw material, providing a gas capable of supporting combustion of the combustible gas thus produced to at least partially calcine the raw material, and separating the treated raw material from the stream of the gases. In one embodiment a stream of oxygen-containing gas is passed upwards through the center of a tubular calcination chamber and the preheated raw material and fuel are intimately mixed in a duct which discharges a suspension of the fuel gas/raw material into the bottom portion of the calcination chamber and into contact with the oxygen-containing gas stream. As a result some eddys are formed between the central gas stream and the chamber wall with simultaneous burning of the fuel gas and calcination of the raw material at a low temperature.

U.S. Pat. No. 3,203,681 to Rosa, et al. relates to a process wherein heat for carrying through the calcination of preheated cement raw meal derives from hot gases having a temperature higher than the calcination temperature. The gases are produced in a separate chamber and are passed upwardly in a riser column in which th raw material is suspended and entrained by the gases thus produced. U.S. Pat. No. 3,452,968 to Shimizu, et al. relates to a process for roasting fine ore wherein preheated raw meal and fuel are ejected individually into a rotating flow of gas ascending upwardly in a calcining chamber. Combustion and the roasting reaction are thus caused in the violently diffusing turbulent flow. U.S. Pat. No. 2,776,132 to Pyzel relates to a process wherein a fluidized bed of hydraulic cement is maintained by charging air into the bottom portion thereof. Raw uncalcined materials in powdered form are charged into the bed along with an amount of fuel sufficient to maintain the bed at a temperature high enough to bring about calcination of raw uncalcined carbonate materials and the formation of cement from the calcined raw materials. U.S. Pat. No. 2,874,950 to Pyzel relates to a process wherein unpreheated cement raw meal is maintained in a fluidized state within a reaction zone by an upward flow of oxygen containing gas. Combustible fuel is charged into the reaction mass in order to maintain the temperature necessary for the heat treatment which consists of calcination and sintering to be carried out within the reaction zone. U.S. Pat. No. 3,013,786 to Pyzel relates to a process wherein preheated feed materials are introduced into a calcining furnace equipped with a burner at one end. Air and fuel are supplied to the calcining furnace through separate pipe means. Combustion of fuel and air takes place in the calcining furnace and the powdered feed material are charged into the combustion gases so generated and are heated to calcining temperatures while carried in suspension in the gases.

According to my invention, a raw material consisting entirely of, or at least containing a portion of lime is at least partially calcined substantially isothermally (i.e. constant temperature conditions) — prior to being burned — at relatively low temperatures while substantially eliminating the disadvantages of the presently known systems particularly by simplifying the process by feeding fuel and preheated raw material separately into the calcination chamber and by thus providing improved contact between the raw material, the fuel and the combustion gas.

SUMMARY OF THE INVENTION

According to the method of the invention a preheated, pulverous raw material consisting of, or at least containing a portion of lime is at least partially calcined. The method comprises passing a stream of oxygen containing gas substantially centrally up through a substantially tubular calcination chamber having an upper portion, a lower portion and an upright axis, and separately feeding into the lower portion of the calcination chamber preheated raw material and a fuel capable of carrying out at least a partial calcination of the preheated raw material. The fuel is preferably either a combustible gas itself or one which is capable of producing a combustible gas upon coming into contact with the preheated raw material. The feeding of the preheated raw material and the fuel into the calcination chamber is arranged in a manner such that eddys are formed between the central gas stream and the calcination chamber wall wherein the combustible gas burns and the individudal particles of raw material are calcined substantially isothermally. The method further comprises passing the at least partially calcined particles of material and exit gases out of the calcination chamber in the central gas stream and separating the particles from the central gas stream.

The invention also relates to a calcination plant for heat treating a preheated, pulverous raw material consisting entirely of, or at least containing a portion of lime to produce at least a partial calcination thereof. A substantially tubular calcination chamber is provided, the chamber having an upper portion, a lower portion and a substantially upright central axis, a bottom wall portion, and an upper wall portion, a substantially central inlet means in the bottom wall portion and means for directing a flow of oxygen containing gas in a substantially upward direction through the substantially central inlet means. The plant further comprises a substantially central outlet portion in the upper wall portion of the calcination chamber, a particle gas separator, duct means communicating said substantially central outlet portion with said particle/gas separator, and duct means for separately introducing fuel and raw material into the lower portion of the chamber in a manner to form eddy currents by the raw material and fuel between the substantially central gas stream and the calcination chamber wall while at least partially calcining the raw material substantially isothermally prior to directing the gas stream to the particle/gas separator for separating the raw material.

An advantage of the invention over the prior art is that an improved intimate mixing of the raw material, fuel, and oxygen containing gas is achieved without the need for means for separately intimately mixing the raw material and fuel prior to their discharge into the calcination chamber. A further advantage of separately discharging the raw material and fuel into the calcination chamber is that they can be discharged into the chamber in different directions or at different positions in order to control more accurately the contact between the fuel, oxygen and raw material particles, and hence the fuel combustion and calcination of the raw material. For example, it is desirable that the raw material particles be discharged towards the central oxygen-containing gas stream so that concentrated eddys of the raw material particles are formed in the bottom of the chamber surrounding the central gas stream and the fuel is discharged into these concentrated eddys so that the fuel gas assists in suspending the raw material particles in the eddys.

In practice, the oxygen containing stream enters the calcination chamber centrally through the bottom of the chamber and the velocity of the gas stream reduces as it spreads out in passing up through the chamber. The gas stream promotes the formation of the eddys by entraining the fuel gas/particle suspension as it comes in contact with the side of the gas stream, the suspension being carried a relatively short distance up the chamber and then falling outwards and downwards before being entrained again. The concentration of the eddys decreases as the eddys rise up the chamber until they are eventually carried out of the top of the chamber. During this process the intimately mixed and evenly distributed fuel gas and raw material particles periodically contact oxygen molecules contained in the gas stream and as this occurs the fuel gas tends to burn. Before any appreciable flame is formed, however, the calcination of the adjacent hot raw material particles is intiated and as the calcination is an endothermic process, the local temperature is lowered so that the fuel gas burns without the formation of flames but with the production of the heat for calcination. The calcination thus takes place substantially isothermally at a desirable low temperature, for example, between 850° and 1000° C. It should be noted that in certain aspects of the present invention — such as the source of oxygen containing gas and the type of fuel used — are similar to the system described in my aforementioned copending application Ser. No. 423,436, filed Dec. 10, 1973, now U.S. Pat. No. 3,955,995.

In a preferred embodiment the bottom wall of the calcination chamber, surrounding the inlet for oxygen-containing gas, slopes inwardly and downwardly. The raw material discharged onto this bottom wall will slide down the inclination into contact with the oxygen-containing gas stream and be picked up by that gas stream to form th lowermost eddys. The fuel may then be discharged upwards through this inclined bottom wall radially inwardly of the duct from which the raw material is discharged so that the fuel is discharged upwards into the raw material which is sliding down the bottom wall.

If a single duct for raw material is provided, a baffle may be used to divide the raw material discharged inwardly toward the central gas stream so that the material is fed symmetrically around both sides of the gas stream. Alternatively, if two or more raw material feed ducts are provided, they may discharge the raw material symmetrically and tangentially to the central oxygen-containing gas stream in order to distribute the raw material around the full periphery of the gas stream.

If the downwardly and inwardly sloping bottom wall of the calcination chamber is smooth, the raw material will tend to spread out over the wall and slide down as a thin layer. There are advantages, however, if the wall surface is formed with an alternating series of crests and valleys which extend inwardly towards th central gas stream, radially or generally tangentially to the gas stream. The crests and valleys may be provided either by corrugations in the bottom wall itself, or by forming them in the upper surface of a bottom wall lining.

As a result of providing the upper surface of the bottom wall with the crests and valleys, the raw material will tend to slide in streams along the valleys, rather than spreading out to form a thin layer over the whole of the bottom wall surface. When the raw material reaches the central upwardly flowing oxygen-containing stream of gas, the streams will act like jets of the raw material and penetrate into the gas stream and become mixed with the inner core of the gas stream. By comparison, when the bottom wall is smooth and the raw material slides downwards as a thin layer, little penetration occurs. The raw material is immediately thrown upwards and outwards by the gas stream, only becoming fully mixed with the inner core of the gas stream at a later stage and higher up the calcination chamber. Further, when the fuel is discharged through the bottom of a valley radially inwardly of the raw material discharge duct there will be a mixing of the fuel and comparatively thick stream of raw material into which the fuel is discharged which is more complete and intimate than would occur if the fuel were discharged upwards into a thin layer of raw material sliding down a smooth bottom wall. As a result of the intimate mixing, when the fuel is a liquid such as oil, or a solid such as coal powder, an intense fuel gas production is attained within the raw material.

Another advantage is that, provided that the fuel is discharged radially inwardly of the raw material discharge duct and through the bottom of a valley, there will be a better intimate mixing of the fuel and comparatively thick stream of raw material into which it is discharged, compared to that which occurs when the fuel is discharged upwards into a thin layer of raw material sliding down a smooth bottom wall. As a result of the intimate mixing, when the fuel is a liquid such as oil, or a solid such as coal powder, an intense fuel gas production is attained within the raw material.

In a rotary kiln plant for preheating, at least partially calcining, and finally burning a pulverous raw material consisting entirely of or at least containing a portion of lime which comprises a cyclone string preheater to preheat pulverous raw material and a rotary kiln having a material inlet end portion and a material outlet end portion. The plant further comprises a calcination plant comprising an upright substantially tubular calcination chamber having an upper portion, a lower portion, a bottom wall defining a substantially central inlet portion, an upper wall and a substantially upright axis, means for directing a flow of oxygen containing gas upwardly through the bottom wall inlet portion in an upward direction toward the upper wall portion. A substantially central outlet portion is provided in the upper wall, with means being provided to direct the mixture of at least partially calcined raw material, oxygen containing gas and fuel into the final cyclone stage of the preheater for separating the raw material. The plant further comprises means to feed preheated raw material from the final stage of the cyclone preheater to the material inlet end portion of the rotary kiln.

BRIEF DESCRIPTION OF THE DRAWINGS

Preferred embodiments of the invention are described hereinbelow with reference to the drawings wherein.

DETAILED DESCRIPTION OF THE PREFERRED EMBODIMENTS

Figure 1:
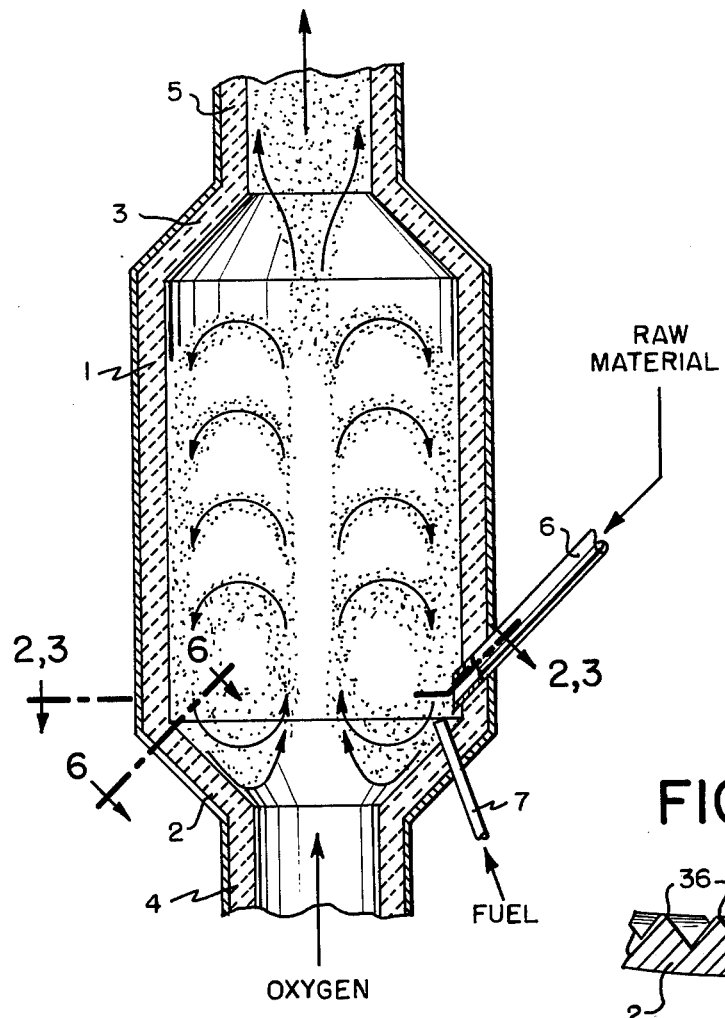
FIG. 1 is a vertical, substantially cross-sectional view of a plant for calcination of raw cement meal according to the invention.

The calcination chamber illustrated in FIG. 1 has a cylindrical body 1, the axis of which is vertical, and frustoconical bottom and top walls 2 and 3. A feed pipe 4 for oxygen containing gas is connected centrally to the bottom wall 2 and a discharge pipe 5 is connected centrally to the top wall 3. A feed pipe 6 for preheated pulverous raw material extends through the lower part of the wall 1 substantially at the same angle as the bottom wall 2. All the parts 1 to 6 inclusive are provided with a heat insulating lining.

A fuel pipe 7 penetrates the bottom wall 2 at a point adjacent to and radially inwardly of the pipe 6. If the fuel used is gaseous or liquid, such as oil, means may be provided for applying pressure to the fuel supply to force the fuel through pipe 7 into the calcination chamber. If a solid fuel such as coal dust is used, it may be forced through the pipe 7 by means of a screw conveyor. Alternatively, a mixture of fuels may be used.

The central arrow labeled "oxygen" at the bottom of FIG. 1 indicates the stream of oxygen-containing gas which passes up into the calcination chamber. The curved arrows shown in FIG. 1 indicate diagrammatically the eddys which are formed throughout the calcination chamber 1 and cause the raw material and fuel to be continually brought into contact with the central gas stream. The clouds of particles, which are shown in these eddys diagrammatically as dots, become less concentrated as the eddys rise in the chamber and the calcined particles and exhaust gases pass out of the chamber through the pipe 5 for subsequent separation of the particles from the gas stream.

Figure 2:
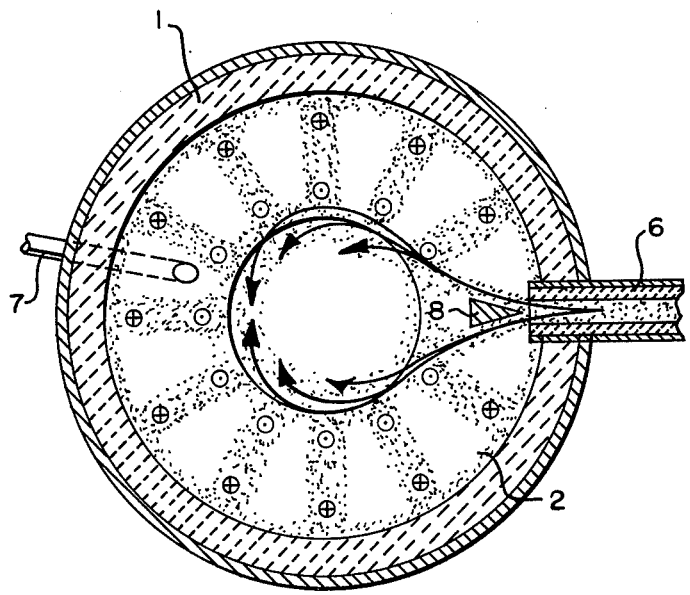
FIG. 2 is a section taken along line 2,3—2,3 of FIG. 1 showing a modification of the plant shown in FIG. 1.
Figure 3:
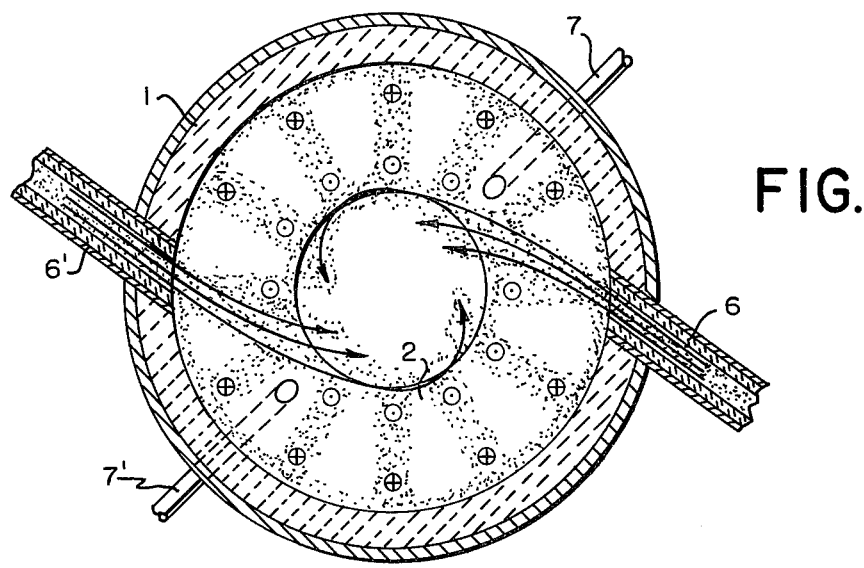
FIG. 3 is a section taken along line 2,3—2,3 of FIG. 1 showing another modification of the plant shown in FIG. 1.

FIGS. 2 and 3 which are sections of the calcination chamber taken along line 2,3—2,3 of FIG. 1, include cross sectional diagrammatic representations of the flow pattern of the eddys as represented diagrammatically in FIG. 1 by the curved arrows. The small circles of FIGS. 2 and 3 having central dots represent the heads of the curved arrows shown in FIG. 1 and the small circles having X's represent the tails of the same arrows.

FIGS. 1 and 2 show the use of a single raw material feed pipe 6. FIG. 2 shows a baffle 8 used to divide the raw material stream around the central gas stream with fuel inlet pipe 7 positioned substantially diametrically opposite the raw material feed pipe 6.

Referring now to FIG. 3, there is shown a modified calcination plant in which two raw material feed pipes 6 and 6' are arranged tangentially on opposite sides of the central gas stream. In this embodiment two fuel feed pipes 7 and 7' are used.

Figure 6:
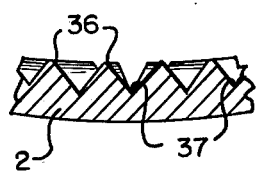
FIG. 6 is a cross-section taken along line 6—6 of FIG. 1, but of the modification as shown in FIG. 4.
Figure 4:
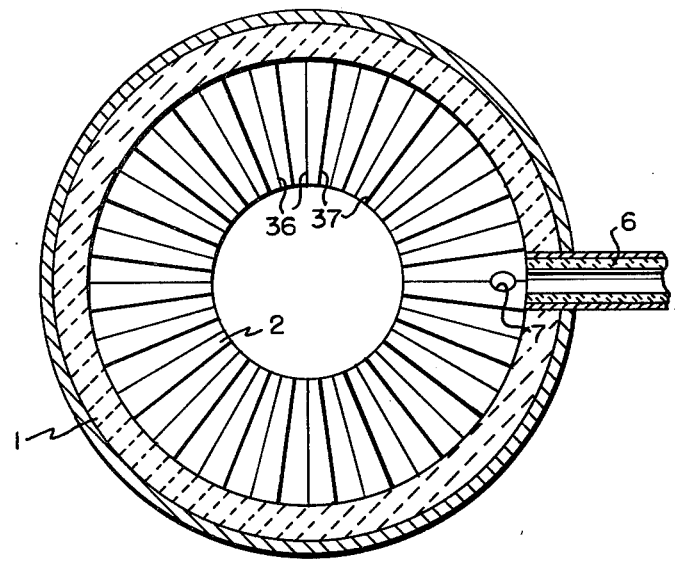
FIG. 4 is a section taken along line 2,3—2,3 of FIG. 1 showing still another modification of the invention.

FIG. 4 shows a modification of the calcination plant shown in FIG. 1 in which the inner surface of the bottom wall 2 is provided with radially extending crests 36 and valleys 37. FIG. 6 shows the crests 36 and valleys 37 of the inner surface of bottom wall 2 as represented in FIG. 4 in cross section. The fuel inlet duct 7 opens into the bottom portion of a valley 37 radially inwardly of the raw material discharge pipe 6 which discharges into the same valley.

Figure 5:
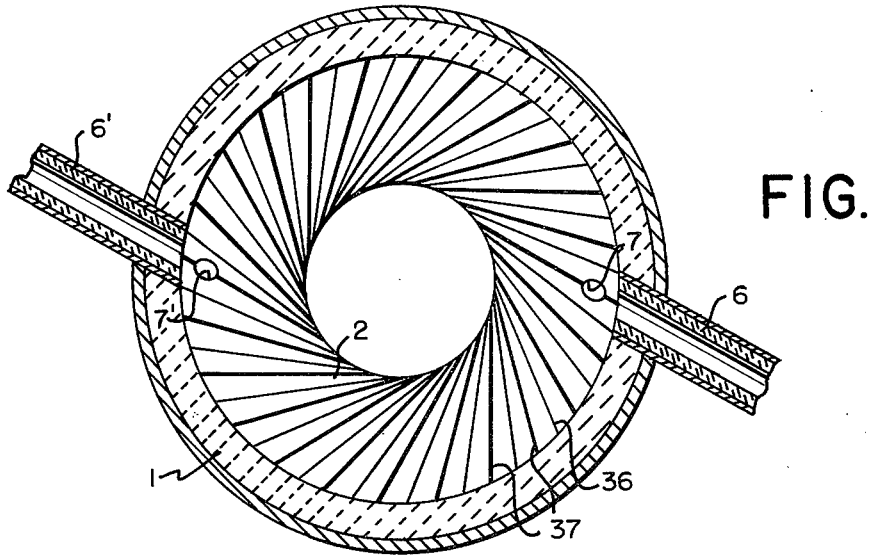
FIG. 5 is a section taken along line 2,3—2,3 of FIG. 1 showing yet another modification of the plant.

FIG. 5 illustrates a modification of the calcination plant which differs from that shown in FIG. 4, in that the crests 36 and valleys 37 extend tangentially to the central gas stream. Material discharge pipes 6 and 6' adjacently paired with fuel inlet ducts 7 and 7' respectively are provided at substantially diametrically opposed positions.

Figure 7:
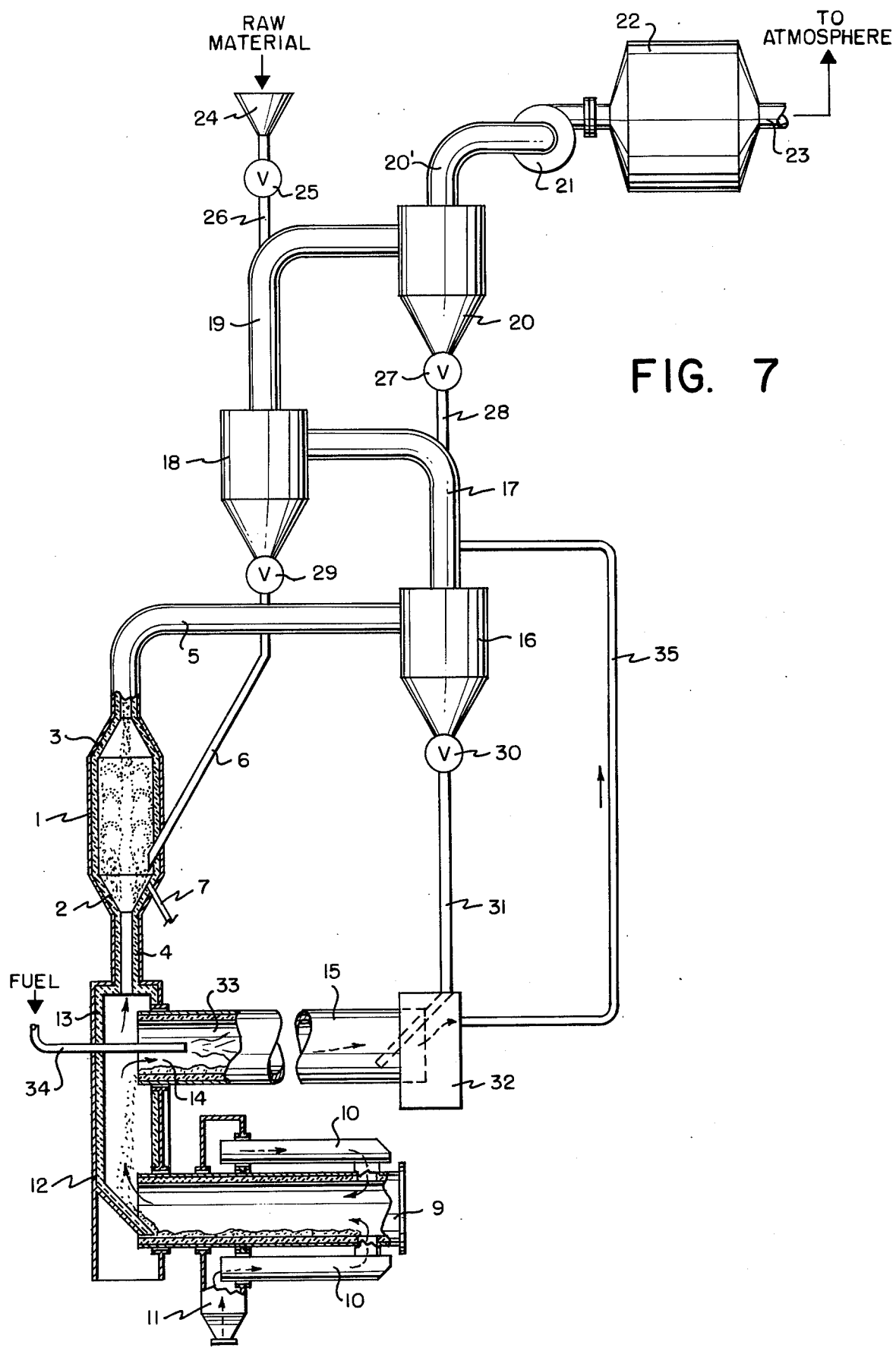
FIG. 7 is an illustration, partly in cross-section, of a complete rotary kiln cement burning plant incorporating by way of example the calcination plant of FIG. 1, but which may incorporate any of the modifications of the plants shown in the other figures.

FIG. 7 shows the calcination plant in a cement burning plant. The plant has a rotary drum cooler 9 equipped with planetary cooler tubes 10 which discharge the finished material into a hopper 11. The waste cooling air from the cooler 9 passes through a hood 12 and is divided, part following arrow 13 through pipe 4 of the calcination chamber 1 and part following arrow 14 into a rotary kiln 15 in which cement clinker is burnt, the clinker leaving the kiln 15 and falling through the hood 12 into the cooler 9.

The kiln 15 is provided with a cyclone string preheater the lower cyclone 16 of which does not form part of the preheater proper. The cyclone 16 is connected through a riser pipe 17 to a cyclone 18 which in turn is connected through a riser pipe 19 to a cyclone 20. Waste gas passes from cyclone 20 through a pipe 20', a blower 21, a filter 22, and finally through a vent 23 to the atmosphere. The cyclones 18 and 20 form the preheater proper.

The raw material is fed into the plant through a hopper 24 and pipe 26 containing a control valve 25. The material is preheated in conventional fashion, by passing through the riser pipe 19, being separated in the cyclone 20, passing through a sluice having a rotary gate valve 27 and there after through pipe 28 into the riser pipe 17 for further preheating and then being separated in the cyclone 18. The preheated raw material passes to the calcination chamber through the pipe 6 the entrance to said pipe being provided with sluice 29.

The at least partly calcined raw material entrained in the gas leaving the calcination chamber through the pipe 5 is separated from the gas in the cyclone 16 and passed through a sluice 30 and pipe 31 into a hood 32 and thereafter into the kiln 15 for burning. The kiln is fired by a flame 33 from the burner tube 34. The waste kiln exit gases may be passed through a pipe 35 for use in the preheater.

I claim:

1. A method of heat treating a preheated, pulverous raw material consisting entirely of, or at least containing a portion of lime to produce a partial calcination in a generally upright elongated calcination chamber having an upper portion and a lower portion, said lower portion being provided with first means for feeding raw material thereinto and being further provided with an inclined annular bottom wall which tapers downward and inward, said bottom wall being provided with second means for feeding fuel into the lower portion of said calcination chamber comprising:
   a. feeding preheated raw material downward through said first feeding means onto said inclined annular bottom wall of said calcination chamber;
   b. separately feeding a fuel capable of carrying out at least a partial calcination of the material upward through said second feeding means into the lower portion of said calcination chamber such that said raw material and said fuel enter the lower portion of said calcination chamber in separate and intersecting paths resulting in substantially immediate and intimate mixing;
   c. directing a stream of oxygen containing gas upward and generally centrally through said calcination chamber to intersect the path of said material and fuel mixture so as to form eddys as said upward directed gas passes through said calcination chamber to cause said fuel to burn and the individual particles of the raw material to be at least partially calcined substantially isothermally;
   d. passing the at least partially calcined material particles and exit gases out of the chamber in the central gas stream; and
   e. separating the particles from said central gas stream.

2. The method according to claim 1 further comprising discharging the fuel through the bottom wall of said lower portion of said calcination chamber in an upward direction towards the central gas stream at a location adjacent to and radially inward from the location of discharge of raw materials onto inner surface portions of said bottom wall.

3. A method of heat treating preheated pulverous raw material consisting entirely of, or at least containing a portion of lime to produce at least a partial calcination in a generally upright elongated calcination chamber having an upper portion and a lower portion, first feeding means communicating with said lower portion and extending downward and inward for feeding raw material into said chamber, an inclined annular bottom wall tapering downward and inward and having inner surface portions provided with a plurality of inwardly extending grooves, second feeding means extending upward and inward for feeding fuel into the lower portion of said calcination chamber comprising:
   a. feeding preheated raw material through said first feeding means into the lower portion of said calcination chamber such that at least a portion of the raw material slides down the bottom wall along at least one of said grooves;
   b. separately feeding a fuel capable of carrying out at least a partial calcination of the material generally upward through said second feeding means into the lower portion of said calcination chamber such that said raw material and said fuel enter the lower portion of said calcination chamber in separate and intesecting paths resulting in substantially immediate and intimate mixing;
   c. directing a stream of oxygen containing gas upward and generally centrally through said calcination chamber to intersect the path of said material and fuel mixture so as to form eddys as said upward directing gas passes through said calcination chamber to cause said fuel to burn and the individual particles of the raw material to be at least partially calcined substantially isothermally;
   d. passing the at least partially calcined material particles and exit gases out of the chamber in the central gas stream; and
   e. separating the particles from said central gas stream.

4. The method according to claim 3 further comprising discharging the fuel through the bottom wall of said lower portion of said calcination chamber in an upward direction towards the central gas stream at a location adjacent to and radially inward from the location of discharge of raw materials on to inner surface portions of said bottom wall.

5. The method according to claim 3 further comprising discharging the fuel through the bottom portion of a groove into which raw material has been discharged.

6. A method of heat treating preheated, pulverous raw material consisting entirely of, or at least containing a portion of lime to produce at least a partial calcination in a generally elongated calcination chamber having an upper portion and a lower portion, said lower portion comprising first means for discharging raw material thereinto and further comprising an inclined annular bottom wall which tapers downward and inward, inner surface portions of said bottom wall defining an alternating series of generally radially extending crests and valleys, said bottom wall being provided with means for dividing the flow of raw material discharged thereon, and second means extending upward and inward for feeding fuel into bottom portions of at least one of the valleys in the lower portion of said calcination chamber and said chamber oriented so that its central axis is generally upright comprising:
 a. discharging preheated raw material into the lower portion of the calcination chamber toward the central axis and down the bottom wall along at least one valley of the inclined annular bottom wall of the lower portion of the calcination chamber such that the raw material flow is divided by said baffle means and distributed generally circumferentially about the central axis of the chamber;
 b. separately feeding a fuel which is at least one of a combustible gas and a fuel capable of producing a combustible gas upon contacting the preheated raw material and capable of carrying out at least a partial calcination of said raw material, the feeding of said fuel being in a generally upward direction through said second feeding means through the bottom wall of the calcination chamber toward the central axis at a location adjacent to, and radially inward of, the location of discharge of raw material such that said raw material and said fuel enter the lower portion of said calcination chamber in separate and intersecting paths resulting in substantially immediate and intimate mixing;
 c. directing a stream of oxygen containing gas substantially centrally upward through the calcination chamber to intersect the path to said material and fuel mixture so as to form eddies as said upward directed gas passes through said calcination chamber to cause said fuel to burn and the individual particles of the raw material to be at least partially calcined substantially isothermally;
 d. directing the at least partially calcined material particles and exit gases out of the chamber in the central gas stream; and
 e. separating the particles from said central gas stream.

7. A method of heat treating preheated, pulverous raw material consisting entirely of, or at least containing a portion of lime to produce at least a partial calcination in a generally elongated calcination chamber having an upper portion and a lower portion, said upper portion having an inclined annular upper wall which tapers upward and inward, said lower portion communicating with a first inclined conduit for feeding raw material thereinto and having an inclined annular bottom wall which tapers downward and inward and defines a generally central opening, inner surface portions of said bottom wall defining an alternating sequence of grooves having peaks and valleys extending generally tangentially of the central opening, baffle means for dividing the flow of raw material discharged into the chamber, second conduit means extending upward and inward for feeding fuel into bottom portions of at least one of said valleys at a location adjacent to and radially inward of the location of discharge of said first conduit and said chamber oriented so that its central axis is generally upright comprising:
 a. discharging preheated raw material into the lower portion of the calcination chamber toward the central axis and down the bottom wall along at least one valley of the inclined annular bottom wall of the lower portion of the calcination chamber such that the raw material flow is divided by said baffle means and thereby distributed generally circumferentially about the central opening of the bottom wall;
 b. separately feeding a fuel which is at least one of a combustible gas and a fuel capable of producing a combustible gas upon contacting the preheated raw material and capable of carrying out at least a partial calcination of said raw material, the feeding of said fuel being in a generally upward direction through said second feeding means through the bottom wall of the calcination chamber toward the central axis into bottom portions of at least one of said valleys such that said raw material and said fuel enter the lower portion of said calcination chamber in separate and intersecting paths resulting in substantially immediate and intimate mixing;
 c. directing a stream of oxygen containing gas substantially centrally upward through the calcination chamber to intersect the path of said material and fuel mixture so as to form eddies as said upward directed gas passes through said calcination chamber to cause said fuel to burn and the individual particles of the raw material to be at least partially calcined substantially isothermally;
 d. directing the at least partially calcined material particles and exit gases out of the chamber in the central gas stream; and
 e. separating the particles from said central gas stream.

8. A calcination plant for heat treating a preheated, pulverous raw material consisting entirely of, or at least containing a portion of lime to produce at least a partial calcination thereof which comprises a substantially upright generally tubular calcination chamber including an upper portion having an upper wall portion defining a generally central outlet opening, a lower portion having an inclined annular bottom wall which tapers downward and inward and defines a generally central inlet opening, a substantially central inlet means in said lower portion, a particle/gas separator, duct means communicating said substantially central outlet portion with said particle/gas separator, duct means for introducing raw material downward and inward into the lower portion of said chamber, separate duct means for introducing fuel upward and inward through said bottom wall into said calcination chamber such that said raw material and said fuel enter the lower portion of said calcination chamber in separate and intesecting paths resulting in substantially immediate and intimate mixing, means for directing a flow of oxygen containing gas through said substantially central inlet opening upward and generally centrally through said calcination chamber to intersect the path of said material and fuel mixture so as to form eddys as said upward directed gas passes through said calcination chamber to cause said fuel to burn and the individual particles of the raw material to be at least partially calcined substantially isothermally prior to directing said central gas stream to said particle/gas separator means for separating the at least partially calcined material particles from said central gas stream.

9. The calcination plant according to claim 8 wherein said material duct means is positioned and oriented to discharge preheated raw material onto bottom wall portions of the calcination chamber.

10. The calcination plant according to claim 9 wherein said raw material and fuel discharge duct means are positioned adjacent each other in pairs.

11. The calcination plant according to claim 8 wherein an inner surface portion of the bottom wall portion within said chamber is defined by an alternating series of inwardly extending crests and valleys.

12. The calcination plant according to claim 9 wherein an inner surface portion of the bottom wall portion within said chamber is defined by an alternating series of inwardly extending crests and valleys.

13. The calcination plant according to claim 10 wherein an inner surface portion of the bottom wall portion within said chamber is defined by an alternating series of inwardly extending crests and valleys.

14. The calcination plant according to claim 13 wherein each material discharge duct discharges raw material into a valley and the corresponding fuel discharge duct opens into the bottom portion of said valley to form a relatively thick downwardly moving layer of raw material.

15. The calcination plant according to claim 8 further comprising baffle means positioned adjacent the raw material discharge end portion of the raw material duct means to divide the raw material discharged inwardly towards the central flow of oxygen containing gas so that the raw material is fed substantially symmetrically about the circumference of the central gas stream and the fuel duct means is positioned and configured to discharge fuel into the calcination chamber at a point substantially diametrically opposite the discharge end portion of the raw material duct means.

16. The calcination plant according to claim 8 further comprising at least two raw material duct means positioned and configured in a manner such that the outlet portions of said duct means discharge the raw material symmetrically and tangentially to the substantially central flow of oxygen containing gas on opposite sides of the central gas flow and two or more fuel duct means are paired with said raw material duct means.

17. The calcination plant according to claim 8 wherein said fuel duct means and said raw material duct means are adjacently paired and positioned in a manner such that outlet portions of said duct means discharge the fuel and raw material at positions adjacent to one another.

18. The calcination plant according to claim 17 wherein the surface portion of the bottom wall portion within said chamber is defined by an alternating series of inwardly extending crests and valleys.

19. The calcination plant according to claim 18 wherein each material discharge duct discharges raw material into a valley and the corresponding fuel discharge duct opens into the bottom portion of said valley to form a relatively thick downwardly moving layer of raw material.

20. The calcination plant according to claim 19 wherein the alternating series of crests and valleys extend inwardly and radially to the flow of oxygen containing gas.

21. The calcination plant according to claim 19 wherein the alternating series of crests and valleys extend inwardly and substantially tangentially to the flow of oxygen containing gas.

22. The calcination plant according to claim 8 wherein said fuel is at least one of a combustible gas and a fuel which is capable of producing a combustible gas upon contacting the preheated raw material.

23. A rotary kiln plant for preheating, at least partially calcining and finally burning pulverous raw material consisting entirely of or at least containing a portion of lime which comprises a cyclone string preheater including at least a lowermost cyclone stage to preheat pulverous raw material, a rotary kiln having a material inlet end portion and a material discharge end portion, a calcination plant comprising a generally upright substantially tubular calcination chamber having an upper portion and a lower portion, a bottom wall defining a substantially central inlet portion, an upper wall, duct means for feeding raw material downward and inward into the lower portion of said calcination chamber, separate duct means for introducing fuel upward and inward through sadi bottom wall into said calcination chamber such that said raw material and said fuel enter the lower portion of said calcination chamber in separate and intersecting paths resulting in substantially immediate and intimate mixing, means for directing a flow of oxygen containing gas through said substantially central inlet means upward and generally centrally through said calcination chamber to intersect the path of said material and fuel mixture so as to form eddies as said upward directed gas passes through said calcination chamber to cause said fuel to burn and the individual particles of the raw material to be at least partially calcined, a substantially central outlet portion in said upper wall of said calcination chamber, means to direct said mixture into said lowermost cyclone stage of said string preheater for separating the at least partially calcined material particles from said central gas stream, and means to feed said preheated material particles from said lowermost stage of said cyclone preheater to the material inlet end portion of said rotary kiln.

24. The rotary kiln plant according to claim 23 further comprising means for cooling raw material communicating with the material discharge end portion of the rotary kiln and with said calcination chamber in such manner that waste cooling air used for cooling material burnt in the kiln provides the oxygen required for nourishing a flame in the rotary kiln and supplies the oxygen containing gas stream used in the calcination chamber.

25. The rotary kiln plant according to claim 24 wherein the calcination chamber has an annular bottom wall portion which slopes downwardly and inwardly.

26. The rotary kiln plant according to claim 25 wherein the bottom wall includes an upper surface having at least one radially extended groove therein.

27. The rotary kiln plant according to claim 25 wherein said material duct means is configured and positioned at an angle relative to a horizontal plane such that raw material is discharged onto the bottom wall portion thereof and at least one fuel duct means is positioned to pass through said bottom wall portion.

28. The rotary kiln plant according to claim 27 wherein the raw material duct means is provided with baffle means to divide the raw material discharged inwardly toward the central flow of oxygen containing gas so that the raw material is fed substantially symmetrically around the circumference of the gas stream and the fuel duct means is positioned and configured to discharge fuel into the calcination chamber at a point substantially diametrically opposite the raw material duct means outlet.

29. The rotary kiln plant according to claim 27 wherein at least two raw material duct means are paired with at least two fuel duct means and are positioned and configured such that the outlet portions of said material duct means discharge raw material substantially symmetrically and substantially tangentially to the central gas flow.

30. The rotary kiln plant according to claim 27 wherein said fuel duct means and said raw material duct means are adjacently paired and positioned such that outlets of said duct means discharge the fuel and the raw material at points adjacent to one another.

31. The rotary kiln plant according to claim 26 wherein the outlet portion of said raw material duct means is positioned and configured to discharge raw material into at least one of said valleys and is adjacent to and paired with a fuel duct means outlet positioned in the bottom portion of said valley.

32. The rotary kiln plant according to claim 31 wherein said alternating series of crests and valleys extend inwardly and radially to the flow of oxygen containing gas.

33. The rotary kiln plant according to claim 14 wherein said alternating series of crests and valleys extend inwardly and in a substantially tangential relation to the flow of oxygen containing gas.

34. The rotary kiln plant according to claim 23 wherein the fuel fed into the calcination plant is at least one of a combustible gas and a fuel capable of producing a combustible gas upon contacting the preheated raw material.

* * * * *